May 1, 1956
C. M. HUNTER
2,743,608
AIRSPEED INDICATOR WITH ALTITUDE CORRECTION
Filed March 15, 1954
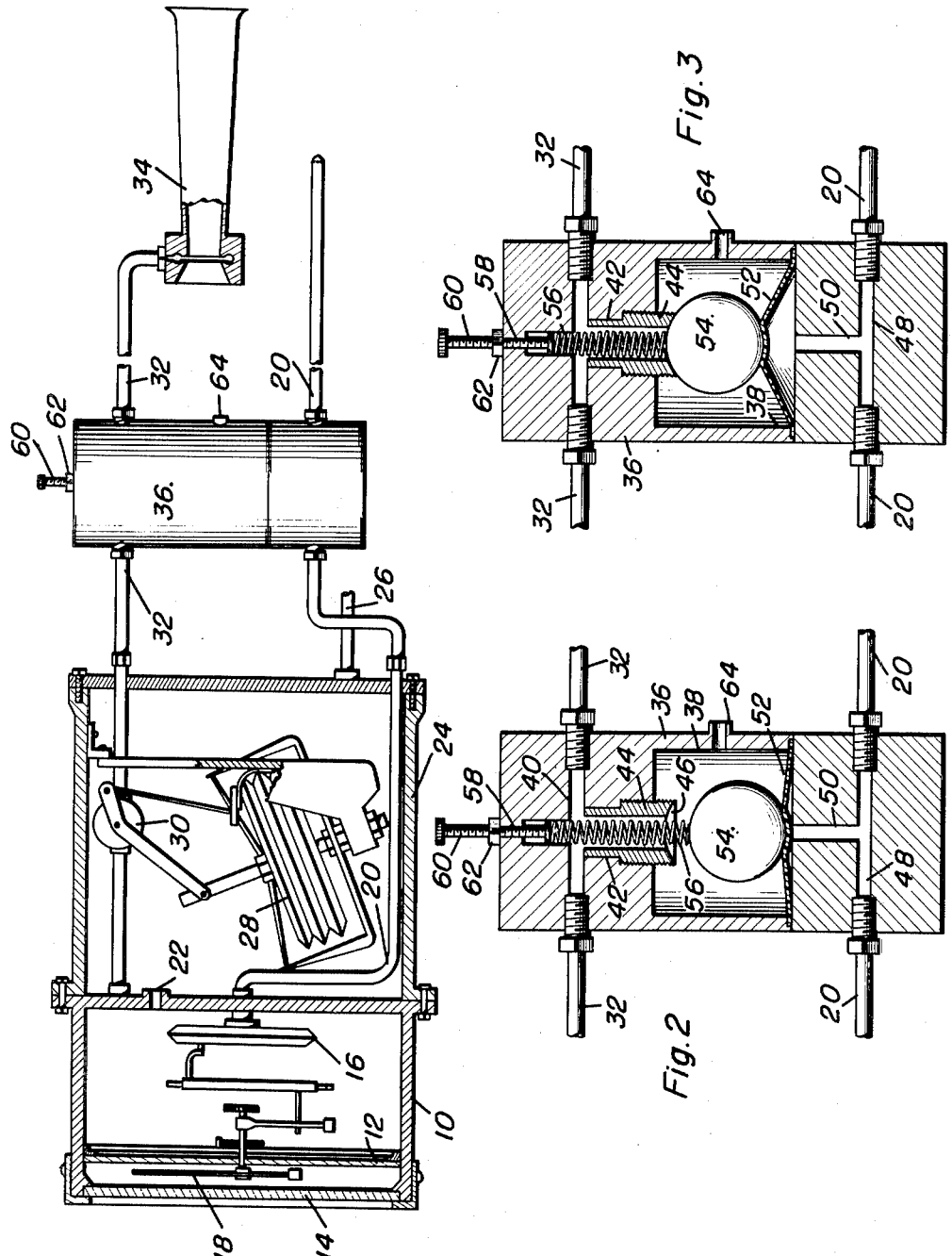
Cecil M. Hunter
INVENTOR.
BY *Clarence A. O'Brien*
*and Harvey B. Jacobson*
Attorneys United States Patent Office 2,743,608
Patented May 1, 1956

2,743,608

AIRSPEED INDICATOR WITH ALTITUDE CORRECTION

Cecil M. Hunter, Tulsa, Okla.

Application March 15, 1954, Serial No. 416,290

4 Claims. (Cl. 73—182)

This invention relates to an improved airspeed indicator with altitude correction and more particularly to an improvement for use with the device disclosed in Patent No. 2,606,444.

At the present time several Civil Aeronautics Administration regulations require that airplanes land, take off and stall at indicated airspeeds. With the device disclosed in Patent No. 2,606,444 the airspeed indicator gives true airspeeds at all times.

An object of this invention is to provide a device for attachment to the above-named airspeed indicator wherein the indicator will give indicated airspeeds below a predetermined airspeed.

Another object of this invention is to provide a device which may be interconnected with the suction producing means and the pitot pressure means of an indicator having an altitude correction.

A further object of this invention is to provide an airspeed controlled valve which is simple and efficient in construction and durable and lasting in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view partly in section showing an airspeed indicator having an altitude correction device and having the improved airspeed controlled valve forming the subject of this invention connected thereto;

Figure 2 is a sectional view of the airspeed controled valve showing the valve in a position wherein the altitude correction device of the airspeed indicator is inoperative; and Figure 3 is a sectional view similar to Figure 2 and showing the valve in position wherein the altitude correction device of the airspeed indicator is in operative position.

Referring now more specifically to the accompany drawings, the airspeed indicator is provided with a housing 10 having a dial 12 mounted therein. The housing 10 is provided with a transparent face 14 closing the forward end thereof. Mounted within the housing 10 is a pressure responsive device 16. The pressure responsive device 16 is connected by suitable linkage to a pointer 18 which provides a reading on the dial 12.

The interior of the pressure responsive device 16 is connected by means of a tube 20 to the Pitot tube of the airplane. The interior of the housing 10 communicates with the atmosphere through an aperture 22 in the rear wall of the casing 10 and through a chamber formed by a housing 24 secured to the rear of the housing 10. A tube 26 is connected to the static pressure tube of the airplane and communicates with the chamber in the housing 24. Pressure responsive means 28 are mounted within the housing 24 and through suitable linkage operates a valve 30 which is positioned in a line 32 connecting the suction means 34 to the interior of the housing 10. The above structure is the same as that disclosed in Patent No. 2,606,444 and the operation is the same.

The airspeed controlled valve forming the subject of this invention is formed of a housing 36. The housing 36 is provided with a central chamber 38. A transverse bore 40 extends through the housing 36 above the chamber 38. The line 32 is adapted to be connected to the transverse bore 40. A longitudinally extending bore 42 extends between the upper end of chamber 38 and the bore 40. Disposed in the longitudinal bore 42 is a bushing 44 having a concave seat 46 extending within the chamber 38.

A transverse bore 48 is provided in the lower portion of the housing 36 below the chamber 38. A longitudinal bore 50 extends between the bottom of the chamber 38 and the transverse bore 48. The line 20 is connected to the transverse bore 48.

Disposed within the chamber 38 adjacent the bottom thereof is a flexible diaphragm 52. A ball 54 is disposed within the chamber 38 above the diaphragm 52. A spring 56 is disposed within the opening in the bushing 44 and engages the top of the ball 54. The upper end of the housing 36 is provided with a threaded aperture 58 which receives therein an externally threaded screw member 60. The screw member 60 is provided with an abutment at its inner end engaging the upper end of spring 56 for varying the pressure exerted by the spring against the ball 54. A suitable lock nut 62 is engaged on the screw member 60 while retaining the same in adjusted position.

The housing 36 is provided with an aperture 64 communicating the chamber 38 with the atmosphere.

In practical use of the device, the housing 36 is mounted in position with the line 32 being connected to transverse bore 40 and line 20 being connected to transverse bore 48. The spring is adjusted so as to retain the ball in the position shown in Figure 2 at speeds below a predetermined speed. When the ball is in the position shown in Figure 2, as the plane flies through the air the suction caused by member 34 will draw air through aperture 64 and through the bore in bushing 44 and through the line 32. Thus, the suction exerted by member 34 will not affect the chamber 10. However, when the speed of the airplane exceeds the predetermined amount pressure will be built up within tube 20 to a sufficient amount to raise the diaphragm and ball 54 to a position as shown in Figure 3. When the ball is in this position the inlet to line 32 from aperture 64 will be cut off and the full effect of the suction created by member 34 will be transmitted to the interior of housing 10. Thus, the airspeed indicator can be set to give true airspeeds above a certain predetermined speed and will give indicated airspeed below the predetermined airspeed.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. For use with an airspeed indicator responsive to differential pressure having means connected thereto for correcting said indicator for various altitudes, said means including a Venturi tube for inducing suction and a bellows arrangement connected to said Venturi tube responsive to suction induced by said Venturi tube, and valve means connected to said bellows by a linkage for actuation thereby, an airspeed controlled valve connected to said valve means for said means for correcting said indicator, said valve comprising a housing, said housing being provided with a central chamber, a transverse bore in said housing, a first longitudinal bore extending from said chamber connected to said transverse bore, a second transverse bore in said housing, a second longitudinal bore extending from said chamber connected to said second transverse bore, a diaphragm mounted in said chamber adjacent the bottom thereof, said diaphragm extending across and closing said chamber preventing communication between said first longitudinal bore and said second longitudinal bore, a ball in said chamber above said diaphragm, and said housing having an opening communicating said chamber with the atmosphere, said ball when moved by said diaphragm preventing fluid communication between said first longitudinal bore and said opening, said first transverse bore being interconnected between said belows arrangement and said Venturi tube, said second transverse bore being interconnected between said indicator and the Pitot tube therefor.

2. The combination of claim 1 wherein said first longitudinal bore is provided with a bushing having a seat thereon extending into said chamber, said ball being adapted to engage said seat to seal said first longitudinal bore whereby the full effect of said means will be transmitted to said indicator.

3. The combination of claim 2, wherein spring means are disposed in said first longitudinal bore, said spring engaging said ball to urge the ball away from said seat whereby said valve will prevent said first means from affecting said indicator.

4. The combination of claim 3, wherein means are provided on said housing for adjusting the tension of said spring means to regulate the airspeed at which said first means will affect said indicator.

References Cited in the file of this patent
UNITED STATES PATENTS

| | | |
|---|---|---|
| 2,183,002 | Bach | Dec. 12, 1939 |
| 2,563,207 | Bevins | Aug. 7, 1951 |
| 2,606,444 | Brown et al. | Aug. 12, 1952 |